United States Patent
Pronovost

(10) Patent No.: US 12,409,863 B1
(45) Date of Patent: Sep. 9, 2025

(54) VECTOR-BASED OBJECT REPRESENTATION FOR VEHICLE PLANNING

(71) Applicant: Zoox, Inc., Foster City, CA (US)

(72) Inventor: Ethan Miller Pronovost, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 329 days.

(21) Appl. No.: 18/087,343

(22) Filed: Dec. 22, 2022

(51) Int. Cl.
*B60W 60/00* (2020.01)
*B60W 30/095* (2012.01)

(52) U.S. Cl.
CPC .... *B60W 60/0027* (2020.02); *B60W 30/0956* (2013.01); *B60W 2420/408* (2024.01); *B60W 2554/4041* (2020.02); *B60W 2554/4044* (2020.02); *B60W 2554/80* (2020.02)

(58) Field of Classification Search
CPC ......... B60W 60/0027; B60W 30/0956; B60W 2420/408; B60W 2554/4041; B60W 2554/4044; B60W 2554/80
See application file for complete search history.

(56) References Cited

U.S. PATENT DOCUMENTS

| | | | |
|---|---|---|---|
| 2019/0180467 A1* | 6/2019 | Li | G01S 17/93 |
| 2022/0012466 A1* | 1/2022 | Taghavi | G06F 18/2163 |
| 2024/0302517 A1* | 9/2024 | Samangooei | G01S 13/583 |
| 2024/0412498 A1* | 12/2024 | Lee | G01S 17/931 |

* cited by examiner

*Primary Examiner* — Navid Z. Mehdizadeh
*Assistant Examiner* — Micah Chuen-Him Cheng
(74) *Attorney, Agent, or Firm* — Lee & Hayes, P.C.

(57) ABSTRACT

Techniques for vector-based representation of objects from sensor data of an autonomous vehicle are described herein. The vector-based representations are generated by identifying intersections of vectors originating at a center of an object and extending radially outward with a perimeter of the object based on sensor data. The vector-based representation may be generated using the intersection points to generate an object representation for use in planning and collision avoidance for an autonomous vehicle.

20 Claims, 6 Drawing Sheets

VECTOR-BASED OBJECT REPRESENTATION FOR VEHICLE PLANNING

BACKGROUND

Vehicles often encounter objects when navigating through an environment. These objects may include other vehicles, pedestrians, animals, and the like. When attempting to safely navigate past a particular object, a vehicle may determine a location, size, and shape of the object. In some situations, the vehicle may determine a size and shape of the object based on a bounding box. However, bounding boxes may fail to provide accurate representations of an object. This failure may compromise the safe navigation of the vehicle past the object.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
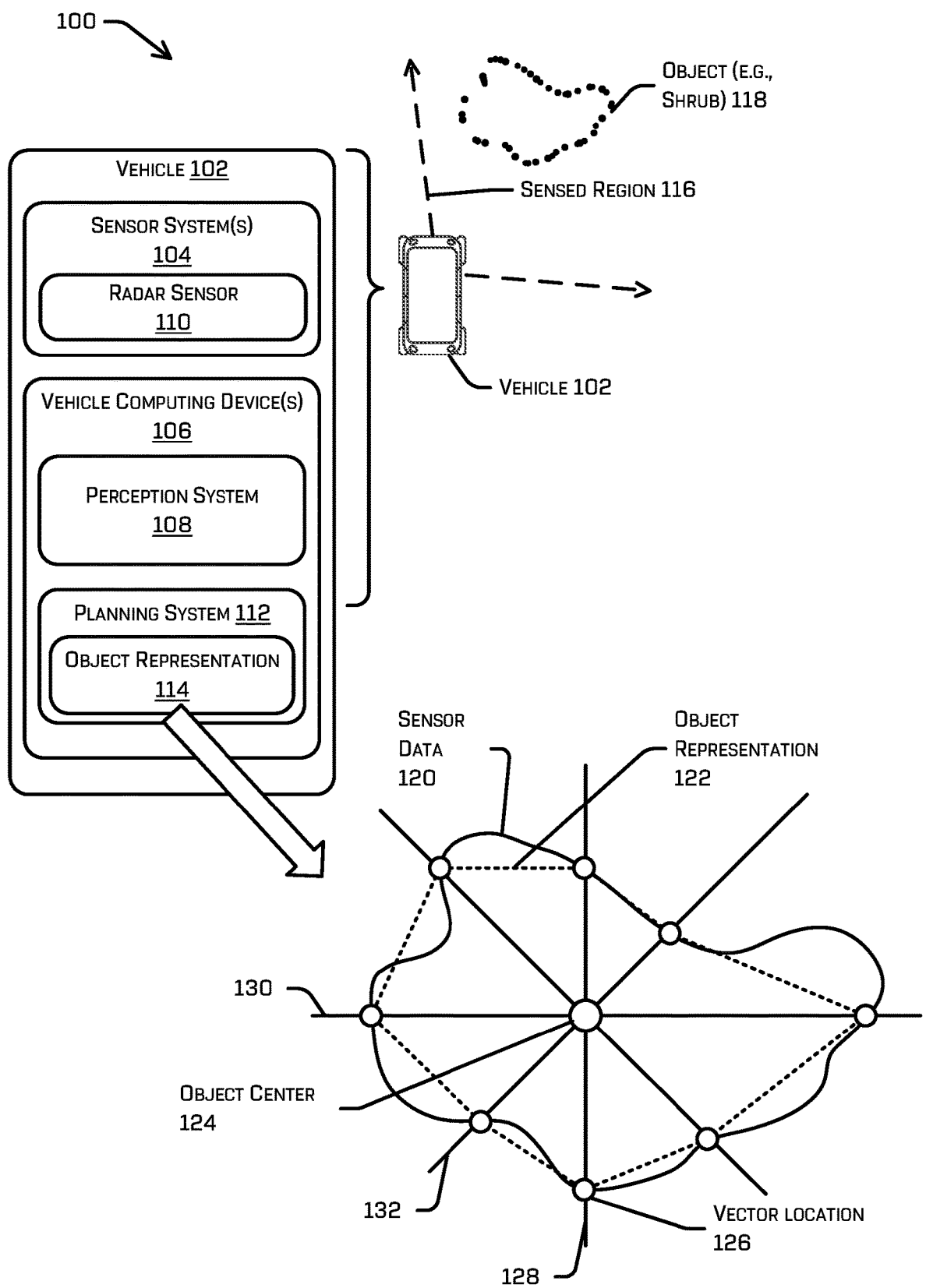
FIG. 1 illustrates an example vehicle system equipped with a sensor system to detect objects in an environment and to generate vector-based representations of the object, according to at least one example.

This disclosure is directed to techniques for determining bounding contours associated with objects and determining bounding regions for objects using vector-based representations. The vector-based representations can be generated by determining vectors from a center of a cluster of points representing an object to a perimeter of the cluster. The ends of the vectors, e.g., where the vectors intersect the perimeter of the cluster of data, may be connected to generate the representation of the object and/or a bounding contour for an object. The vectors can each include a magnitude component that represents a distance from a center of the object and a direction for the vector. The representation and/or bounding contour may be used for actions such as collision avoidance. In some examples, a lidar sensor may receive lidar data associated with an object. The lidar data may be projected into a two-dimensional plane and an object representation can be identified based on the projected lidar data. The bounding contour can be used, for example, in a planning component of a vehicle to determine whether the vehicle is likely to collide with the object represented by the bounding contour.

In some examples, vectors may extend radially from a center (e.g., a centroid, barycenter, or other such geometric center location) of a representation of an object. The vectors may extend in equal spacing around the center in some examples. In some examples, the vectors may extend in equal spacing and therefore the definitions for the vectors may only include notation of the magnitudes for the vectors, using the preassigned directions. In some examples, the number of vectors and/or directions of the vectors may be dynamically adjustable to accommodate and more accurately represent a complex object and/or geometry. The number of vectors, directions of vectors, and other such characteristics of the representation may be based, in some examples, on an object classification determined based on one or more systems of the vehicle. In some examples, intersections of the vectors and the perimeter of the representation of the object may be connected to form a vector-based representation. The vector-based representation may more accurately reflect the geometry of an object than a bounding box, and thereby provide improved collision avoidance or route planning for a vehicle. In some examples, the vector-based representation may be determined by a perception component of an autonomous vehicle and may be consumed by one or more additional systems of the autonomous vehicle, such as for route planning. For example, a perception component may receive sensor data and/or other data and output a rich contour (e.g., a detailed representation) for use by other systems of the vehicle. In some examples, the rich contour may be used to generate the vector-based representation as described herein. Additionally, the vector-based representation may use a small, discrete number of points to represent the object, which may increase processing speed and reduce computational burden for route planning and/or collision avoidance and thereby improve performance of vehicle systems.

In some examples, a system may determine whether a vehicle is likely to collide with an object based on a bounding contour associated with the object. If a likely collision is detected, the system may determine a vehicle action to avoid collision with the object and initiate that action in an attempt to avoid the collision. In other examples, an action may be determined based on the bounding contour associated with the object. For example, the action may include at least one of controlling a vehicle, determining a static object, determining a dynamic object, or updating map data.

In some examples, a vector-based representation may be identified that is associated with an object identified in lidar point cloud data. The size of the representation may be expanded to include a greater amount of the lidar point cloud data. Lidar points within the expanded representation can be captured to provide increased lidar data associated with the object. A bounding shape associated with all of the lidar points in the expanded bounding box may be created to better represent the contour of the object.

In some examples, a system may determine that an initial vector-based representation does not reflect the contour of an object with sufficient accuracy, for example by identifying portions of data that fall outside of the vector-based representation, when such portions exceed a threshold amount or size, the system may determine to further refine the shape of the vector-based representation using additional vectors. In some examples the vectors may be equally spaced around the center of the object. In some examples, the vectors may include additional vectors used to refine the shape in particular regions by identifying portions of the sensor data that fall outside the representation and adding additional vector-point intersections to further refine the perimeter and shape of the vector-based representation. Although described herein with reference to radar data, the vector-based representations described herein may be implemented with other sensor modalities such as lidar, vision, acoustic, or other such sensors and modalities.

In some examples, a system may receive a trajectory associated with a vehicle and receive sensor data from a sensor associated with the vehicle. A vector-based representation may be determined, where the representation is associated with an object represented in the sensor data. Based on the trajectory associated with the vehicle, the system may determine a simulated position of the vehicle. Additionally, a predicted position of the object based on the representation may be determined. Based on the simulated position of the vehicle and the predicted position of the representation, a distance between the vehicle and the object may be determined. An action can be performed based on the distance between the vehicle and the object.

In some examples, the vector-based representation discussed herein may be a polygon that closely identifies the perimeter of the object. The action to be performed based on the distance between the vehicle and the object may include validating the trajectory or invalidating the trajectory. In some examples, the distance between the vehicle and the object may be determined using ray casting. For example, the ray traces may extend (e.g., perpendicularly) from the side of a vehicle (or from a point associated with a trajectory) toward a bounding contour. A collision can be detected based on a number of bounding contour edges the ray passes through. For example, if the ray passes through an even number of bounding contour edges, there is no collision. But, if the ray passes through an odd number of bounding contour edges, a collision will occur between the vehicle and the object.

In some examples, the vector-based representation may be generated based on heuristics that provide for vector spacing and identifying intersections between the vectors and the perimeter or bounds of the object based on the clusters of sensor data. In some examples, a machine learning model may receive the sensor data and may output the vector-based representation of the object, with the machine learning model trained using training data such as the data from a heuristic-type model.

In some examples, the vector-based representation may be generated by connecting the ends of the vectors into a bounding contour. For example, segments connecting adjacent vectors may define the bounding contour of the object for the representation. In some examples, the ends of the vectors may be connected using linear, polynomial, and other line types to connect between the end points of the vectors and thereby form the bounding contour.

The techniques discussed herein can improve the functioning of a computing device of a vehicle in a number of ways. The described techniques provide an improved representation of a shape of an object. As described herein, a contour provides a polygon that closely follows a perimeter of an object. The contour is not limited to four sides like a bounding box. Thus, the contour can adjust to all of the object's shapes to provide an accurate representation of the object. The tight-fitting bounding contour supports more accurate determinations of potential collisions, distances between vehicles and objects, and other actions related to objects.

The techniques discussed herein may also provide improved functioning of a computing device of a vehicle by determining a contour faster and with fewer computing resources. As compared to existing techniques, such as a Delaunay triangulation, the described systems and methods may simplify the creation of a contour without the need to create multiple triangles that cover every point in a set of points. The Delaunay triangulation process, which requires the creation of multiple triangles in the set of points can be time-consuming and requires significant computing resources. The systems and methods described herein may simplify the process by eliminating the need to calculate triangles in a set of points.

The techniques described herein can be implemented in a number of ways. Example implementations are provided below with reference to the following figures. Although discussed in the context of an autonomous vehicle, the methods, apparatuses, and systems described herein can be applied to a variety of systems and are not limited to autonomous vehicles. In another example, the techniques can be utilized in any type of vehicle, robotic system, or any system using sensor data. Additionally, the techniques described herein can be used with real data (e.g., captured using sensor(s)), simulated data (e.g., generated by a simulator), or any combination of the two.

FIG. 1 illustrates an example vehicle 102 equipped with a sensor system to detect objects in an environment 100 and to generate vector-based representations of the object, according to at least one example. In the illustrated example, the vehicle 102 includes one or more sensor system(s) 104 capturing data representing the environment 100. By way of example and not limitation, the vehicle 102 can be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle 102 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 102 are described below.

In at least one example, and as noted above, the vehicle 102 can be associated with sensor system(s) 104 that can be disposed on the vehicle 102. The sensor system(s) 104 can include radio detection and ranging (radar 110) sensors, light detection and ranging (lidar) sensors, ultrasonic transducers, sound navigation and ranging (sonar) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, time of flight, etc.), wheel encoders, microphones, environment sensors (e.g., temperature sensors, humidity sensors, light sensors, pressure sensors, etc.), etc. The sensor system(s) 104 can generate sensor data, which can be utilized by vehicle computing device(s) 106 associated with the vehicle 102. However, in other examples, some or all of the sensor system(s) 104 and/or vehicle computing device(s) 106 may be separate from and/or disposed remotely from the vehicle 102 and data capture, processing, commands, and/or controls May be communicated to/from the vehicle 102 by one or more remote computing devices via wired and/or wireless networks.

In at least one example, the vehicle computing device(s) 106 can utilize sensor data captured by the one or more sensors systems 104 in an object representation component 108 to determine vector-based representations 122. The vector-based representations are generated by determining vectors from a center of a cluster of points representing an object (e.g., sensor data 120) to a perimeter of the cluster. The ends of the vectors, e.g., where the vectors intersect the perimeter of the cluster of data, may be connected to generate the representation of the object and/or a bounding contour for an object. The representation 122 and/or bounding contour may be used for actions such as collision avoidance. In some examples, a lidar sensor may receive lidar data associated with an object. The lidar data may be projected into a two-dimensional plane and an object representation can be identified based on the projected lidar data. The representation 122 can be used, for example, in a planning component of a vehicle to determine whether the vehicle is likely to collide with the object represented by the representation 122.

In some examples, vectors 126, 128, 130, and 132 may extend radially from a center 124 (e.g., a centroid or other such geometric center location) of a representation 122 of an object. The vectors 126, 128, 130, and 132 may extend in equal spacing around the center 124 in some examples. Intersections of the vectors 126, 128, 130, and 132 and the perimeter of the representation of the object (sensor data 120) may be connected to form a vector-based representation 122. The vector-based representation 122 may more accurately reflect the geometry of an object than a bounding box, and thereby provide improved collision avoidance or route planning for a vehicle. Additionally, the vector-based representation may use a small, discrete number of points to represent the object, which may increase processing speed and reduce computational burden for route planning and/or collision avoidance and thereby improve performance of vehicle systems.

In some examples, a vector-based representation 122 may be identified that is associated with an object identified in lidar point cloud data. The size of the representation 122 may be expanded to include a greater amount of the lidar point cloud data. Lidar points within the expanded representation can be captured to provide increased lidar data associated with the object. A bounding shape associated with all of the lidar points in the expanded bounding box may be created to better represent the contour of the object.

By way of example, and without limitation, the vehicle 102 is capturing sensor data, including radar sensor data, while traversing the environment 100. In the illustrated example, the sensor systems 104 include a radar sensor 110 having a field of view covering at least a portion of the environment 100 surrounding the vehicle 102. The portion of the environment 100 captured by the field of view is depicted in this example as sensed region 116. In various examples, the vehicle 102 may have any number of one or more radar sensors (e.g., 1, 2, 4, 5, 8, 10, etc.). In the illustrated example, the field of view is depicted as being about a 110-degree view. However, in other examples, the field of view of the radar sensors can be greater than (e.g., 120 degrees, 180 degrees, 220 degrees, 270 degrees, 360 degrees, etc.) or less than (e.g., 90 degrees, 60 degrees, 45 degrees, etc.) this angle. Moreover, the vehicle 102 may include multiple radar sensors having multiple different fields of view, ranges, scan rates, and the like.

In the illustrated example, one or more objects 118 are located in the sensed region 116. The one or more objects 118 may include a static object (e.g., a tree, pole, sign, building, parked car, etc.) and a dynamic object (e.g., a pedestrian, vehicle, bicycle, animal, etc.). The radar sensor 110 captures radar sensor data corresponding to the static object and the dynamic object, and the object representation component 114 generates a vector-based representation of the object 118

Computing device(s) 106 may comprise a memory storing a perception component 108, a planning component 112, an object representation component 114, and other such components, including for example a collision avoidance component, and/or system controller(s). Although depicted in FIG. 1 for illustrative purposes, it should be understood that the components may reside in/on a separate computing device (or otherwise) than any one or more of the other components. In some examples, the perception component 108 may be a primary perception component among other perception components, such as a secondary perception component that may be part of collision avoidance component. In general, the perception component 108 may determine what is in the environment surrounding the vehicle 102 and the planning component 112 may determine how to operate the vehicle 102 according to information received from the perception component 108. For example, the planning component 112 may determine a trajectory based at least in part on the perception data and/or other information such as, for example, one or more maps, localization information (e.g., where the vehicle 102 is in the environment relative to a map and/or features detected by the perception component 108), and/or the like. The trajectory may comprise instructions for controller(s) to actuate drive components of the vehicle 102 to effectuate a steering angle and/or steering rate, which may result in a vehicle position, vehicle velocity, and/or vehicle acceleration. For example, the trajectory may comprise a target heading, target steering angle, target steering rate, target position, target velocity, and/or target acceleration for the controller(s) to track. The perception component 108, the planning component 112, and/or the object representation component 114 may include one or more machine-learned (ML) models and/or other computer-executable instructions.

In some examples, the perception component 108 may receive sensor data from the sensor(s) 104 and determine data related to objects in the vicinity of the vehicle 102 (e.g., classifications associated with detected objects, instance segmentation(s), semantic segmentation(s), two and/or three-dimensional bounding boxes, tracks), route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. The object classifications determined by the perception component 108 may distinguish between different object types such as, for example, a passenger vehicle, a pedestrian, a bicyclist, a delivery truck, a semi-truck, traffic signage, and/or the like. A track may comprise a historical, current, and/or predicted object position, velocity, acceleration, and/or heading. The data produced by the perception component 108 may be collectively referred to as perception data. Once the perception component 108 has generated perception data, the perception component 108 may provide the perception data to the planning component 112.

The planning component 112 may use the perception data received from perception component 108, to generate vector-based representations, as discussed herein, as well as to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 112 may determine a route for the vehicle 102 from a first location to a second location; generate, substantially simultaneously and based at least in part on the perception data and/or simulated perception data (which may further include predictions regarding detected objects in such data), a plurality of potential trajectories for controlling motion of the vehicle 102 in accordance with a receding horizon technique (e.g., 1 micro-second, half a second) to control the vehicle to traverse the route (e.g., in order to avoid any of the detected objects); and select one of the potential trajectories as a trajectory of the vehicle 102 that May be used to generate a drive control signal that may be transmitted to drive components of the vehicle 102.

In some examples, the perception component 108 may comprise a pipeline of hardware and/or software, which may include one or more GPU(s), ML model(s), Kalman filter(s), and/or the like. In some examples, the perception component 108 may monitor as much of the environment surrounding the autonomous vehicle as possible, which may be limited by sensor capabilities, object and/or environmental occlusions (e.g., buildings, elevation changes, objects in front of other objects), and/or environmental effects such as fog, snow, and/or the like. For example, the sensor data may comprise LIDAR and/or radar data, which the perception component 108 may receive as input. The perception component 108 may be configured to detect as many objects and information about the environment as possible to avoid failing to account for an event or object behavior that should be taken into account by the planning component 112 in determining the trajectory.

In some examples, one or more ML model(s) may be used to encode and/or determine the vectors defining the representation of the object. In some examples, the number and directions for the vectors may be predetermined and may be determined using heuristics and/or a machine learning model trained to identify the center of the object as well as the edge of the object from the sensor data. The ML model may then determine and/or encode a data structure with the vector magnitudes, and in some cases directions, that define the object representation for use by one or more other systems of the vehicle.

By contrast, a collision avoidance component may monitor a region that may be less than the entire region within an effective range of the sensor(s) 104. The collision avoidance component may determine a subset of the sensor data associated with the region and conduct the operations discussed herein based at least in part on the subset. For example, in the example scenario, the collision avoidance component may determine a subset that comprises sensor data that includes the portion of the environment indicated by region, which may comprise a part of the representation 122. Although, in additional or alternate examples, the collision avoidance component may monitor the same region as the perception component 108.

The collision avoidance component may monitor sensor data associated with the region to ensure the trajectory will not or is not likely to result in a collision. In some examples, this may comprise receiving sensor data, such as image, and generating a top-down representation of the environment and the objects therein, as discussed in more detail herein. The collision avoidance component may comprise a secondary perception component that generates a top-down representation of the environment and classify portions thereof as being occupied or unoccupied. In some examples, the collision avoidance component may additionally or alternatively determine whether an occupied portion is dynamic or static.

The collision avoidance component may additionally or alternatively comprise a validation component that may determine the threshold distance discussed herein and/or determine whether to validate or reject a trajectory. Validating the trajectory may comprise transmitting the trajectory to a controller(s) (e.g., the validation component may comprise a multiplexer, one or more transistors configured as a switch that passes the trajectory upon receiving a signal from the validation component, and/or the like that may provide a signal that allows the trajectory signal to pass to the controller(s)). Rejecting the trajectory may comprise transmitting a message to the planning component 112 to initiate re-determining a trajectory and/or initiating an alternate maneuver, such as a safe stop maneuver (e.g., emergency braking, pull over and park) and/or a contingent trajectory that may be received from the planning component 112 in addition to the trajectory and/or stored in the memory. In some examples, the collision avoidance may determine that at least a portion of the subset of the sensor data is valid or invalid based at least in part on an orientation of the sensors and/or a topology of the environment and/or a lower and upper bound of a valid portion of the sensor data, as discussed in more detail herein.

In some examples, the controller(s) may comprise software and/or hardware for actuating drive components of the vehicle 102 sufficient to track the trajectory. For example, the controller(s) may comprise one or more proportional-integral-derivative (PID) controllers. Other components and systems of the vehicle 102 are discussed with respect to FIG. 6.

Figure 2:
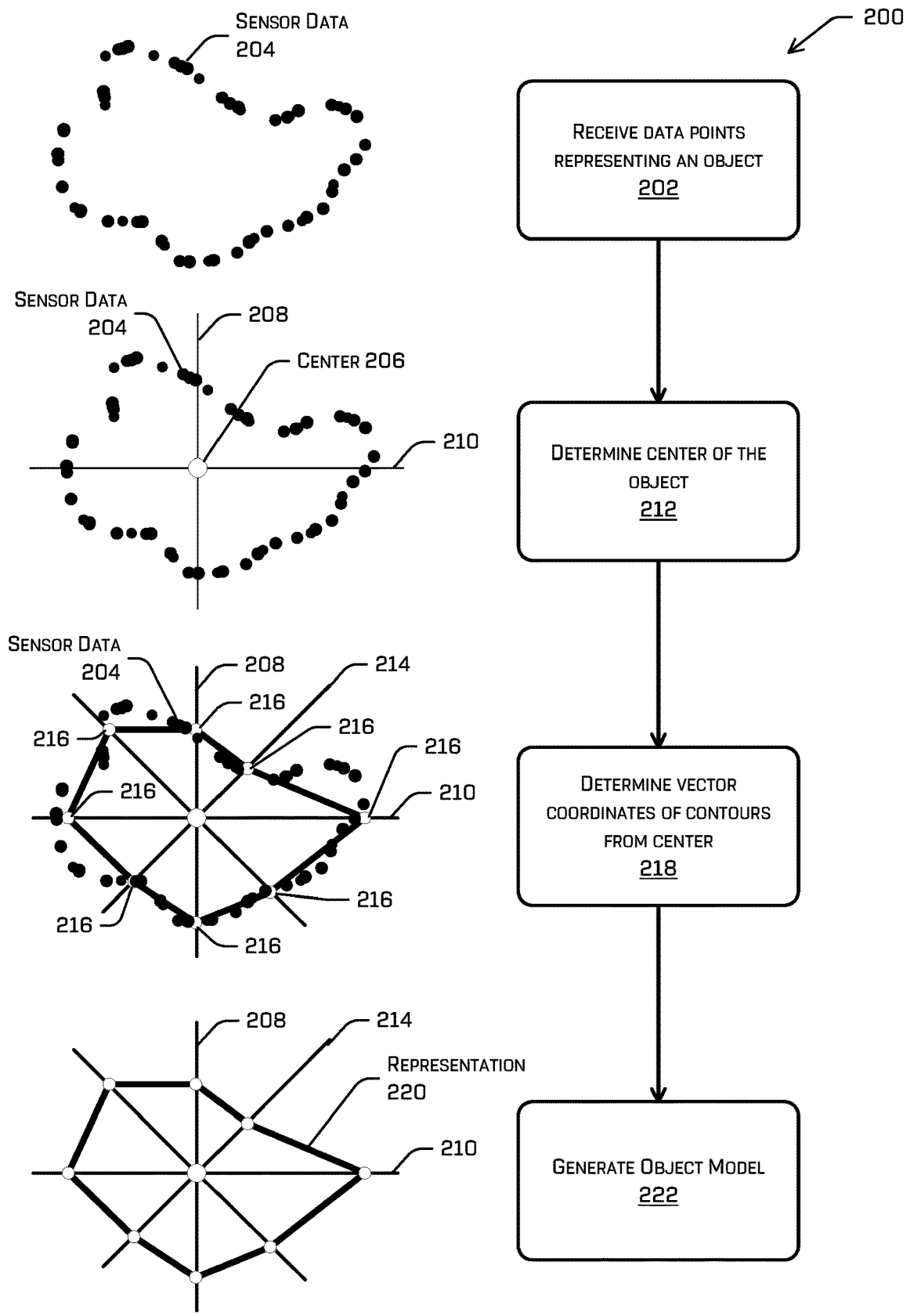
FIG. 2 illustrates an example process for generating a vector-based representation of an object from a collection of sensor data, according to at least one example.

FIG. 2 illustrates an example process 200 for generating a vector-based representation of an object from a collection of sensor data, according to at least one example. In particular, FIG. 2 includes textual and graphical flowcharts illustrative of the process 200, according to implementations of this disclosure. In some examples, the process 200 can be implemented using components and systems illustrated in FIG. 1 and described above, although the process 200 is not limited to being performed by such components and systems. Moreover, the components and systems of FIG. 1 are not limited to performing the process 200.

By way of example, the processes shown in FIGS. 2-5 are illustrated as a logical flow graphs, each operation of which represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the process 300. In some examples, multiple branches represent alternate implementations that may be used separately or in combination with other operations discussed herein.

In more detail, the process 200 can include, at an operation 202, receiving data points representing an object. For example, a planning system of an autonomous vehicle may receive the vector-based representation from a perception system. The perception system may receive a point cloud or other group of points may include a perimeter and/or determination of object type, or other such information. The sensor data 204 may come from one or more sensors of the vehicle 102. The example sensor data 204 includes a group of points generally associated with an object in an environment. For example, the sensor data 204 may be generated by one or more sensors on an autonomous vehicle and/or may be derived from sensor data captured by one or more sensors on an autonomous vehicle. In some examples, the sensor data 204 may be grouped as a plurality of points associated with a single object. In at least some examples, the sensor data 204 may include segmentation information, which may associate each of the points of the sensor data 204 with an object.

In some examples, the sensor data 204 may be determined as a top-down representation of an object, e.g., in a two-dimensional (e.g., x-y) coordinate system. Although the sensor data 204 include points forming (or outlining) a generally continuous contour, in other examples, sensors may provide data about fewer than all sides of a to-be-modelled object, e.g., because the sensor(s) may be unable to obtain data about hidden or occluded surfaces. In examples, sensor data 204 on such hidden or occluded surfaces may be estimated, e.g., based on known shapes and sizes of objects, and/or the model may be generated without points on the hidden or occluded surfaces. For example, the model may be updated, as described herein, without the points on the hidden or occluded surfaces.

Although this example contemplates some preprocessing of sensor data to determine that the sensor data 204 are all candidates for association with a single object, in other examples, the sensor data 204 may be associated with an object in other ways. For example, in some instances, all objects could be modeled using the techniques described herein, although this could lead to unnecessary processing.

As also illustrated, the process 200 can include, at an operation 212, determining a center 206 of the object. The center 206 of the object may be determined by a perception and/or planning component. In some examples, the center may be determined based on minimizing a distance from the center 206 to each of the sensor data 204 points around the perimeter. In some examples, the center 206 may include a centroid or other such geometric determination of the center of the object and/or the barycenter of the object. Additionally, a set of vectors and/or axes 208 and 210 may be determined that extend radially from the center 206. In some examples, data from different sensor types and modalities may be used to determine the center and/or the vectors and/or axes defining the object. For instance, image data may be used to increase a confidence score associated with the location of the center and/or location of the axes for the object. In some examples, data from different modalities may be combined to determine the locations for the centers, axes, etc.

As illustrated, the process 200 also includes determining vector coordinates for contours of the object from the center 206 at operation 218. The vector coordinates may be determined by extending, radially from the center 206, vectors along axes 208 and 210 as well as along other directions, such as direction 214. The intersections 216 of the vectors along the axes and the sensor data 204 may be used to determine contours of an object representation.

In some examples, the vectors may be equally spaced around the center 206. In some examples, there may be four vectors, eight vectors, or any number of vectors used to determine the intersections 216 and thereby define the contours of the object representation 220. In some examples, such as shown and described with respect to FIG. 3, the vectors May extend from the center 206 but may not be equally spaced around the center 206 and may extend in particular directions based on the contours of the sensor data 204.

The process 200 also includes generating an object model at operation 222. The object model includes a representation 220 generated by connecting adjacent intersections 216 to form the perimeter of the representation 220. The representation 220 may then be used for one or more calculations and/or determinations by a vehicle or other computing system, as discussed herein.

Figure 3:
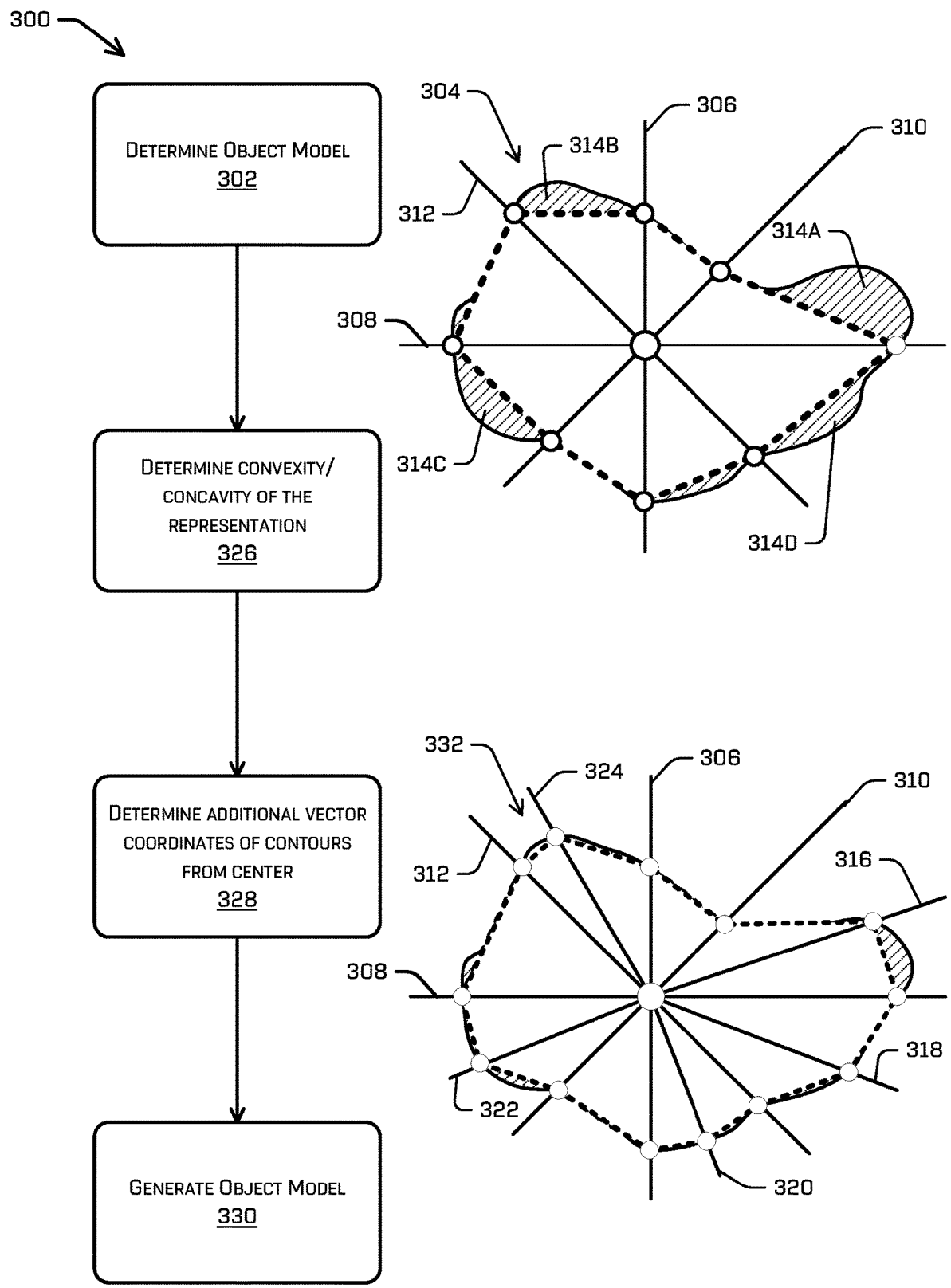
FIG. 3 illustrates an example process for refining a vector-based representation of an object, according to at least one example.

FIG. 3 illustrates an example process for refining a vector-based representation of an object, according to at least one example. In particular, FIG. 3 includes textual and graphical flowcharts illustrative of the process 300, according to implementations of this disclosure. In some examples, the process 300 can be implemented using components and systems illustrated in FIG. 1 and described above, although the process 300 is not limited to being performed by such components and systems. Moreover, the components and systems of FIG. 1 are not limited to performing the process 300.

The process 300 includes, at operation 302, to determine an object model 304. The object model 304 may be determined as described with respect to FIG. 2. The object model 304 includes a vector-based representation of an object determined based on vector intersections with a perimeter of the object as perceived by sensor data. In some examples, the system may determine that the object model is not sufficiently accurate to the perimeter of the object and may refine the vector-based representation (e.g., object model 304) according to the process 300.

The object model 304 includes a center with vertical axis 306 and horizontal axis 308 passing through the center of the object model 304. Additional axes 310 and 312 may be extended from the center offset from the vertical axis 306 and horizontal axis 308, for example at 45 degrees with respect to each.

In some examples, the system may identify portions 314A, 314B, 314C, and 314D that fall outside of the object model 304. In some examples, the system may evaluate the proportion of the object model 304 that extends beyond and/or falls outside of the bounds of the object model 304. In the event that one or more of the portions 314A, 314B, 314C, and/or 314D includes a portion of the sensor data greater than a threshold amount, the system may determine to refine the object model 304 with additional vector definitions. The additional vector definitions and refinement of the object model 304 may be performed iteratively until the object model 304 meets a metric such as adherence or coverage percentage of the object model 304 over the sensor data. In some examples, the portions 314A, 314B, 314C, and/or 314D may be identified as outlying regions beyond the bounds of the vector-based representation. In some examples, additional vectors may be added, for example from a budget or predetermined maximum number of vectors, until the size, proportion, or identified portions 314A, 314B, 314C, and/or 314D meet a particular metric.

At operation 326, in some examples, the process 300 may include to determine convexity and/or concavity of the object model 304. The convexity and/or concavity may be determined for particular portions of the perimeter of the object model 304 using geometric techniques to identify portions of the model that have a concavity and/or convexity over a threshold amount, and are therefore not likely to be accurately represented by the object model 304 due to the limited number of initial vectors used to define the object model 304. The concavity and/or convexity evaluation may aid in identifying portions of the perimeter of the object where the perimeter drastically moves toward or away from the center and thereby may not follow the approximation made by the intersections along the eight directions illustrated in the object model 304. In some examples, the connections between the intersections may be approximated by linear segments, curved segments, polynomial-equation defined segments, or other such geometric definitions that may also be encoded with the vector-based representation to define the contours between adjacent vectors.

Accordingly, at operation 328, the process 300 includes to determine additional vector coordinates of contours from the center of the object. The additional vectors may extend along axes 316, 318, 320, 322, and 324 as shown in FIG. 3. The additional vectors may be equally spaced around the center, in some examples. In some examples, such as illustrated in FIG. 3, the additional vectors may be positioned such that they are directed at the portions 314A, 314B, 314C, and 314D identified with respect to the object model 304. In such examples, the direction may be based on identification of the location of the portions that fall outside of the object model 304 and/or the portions where the object model 304 extends beyond the sensor data (e.g., a concavity). In either case, the addition of the vectors increases the resolution of the object model 332 and provides a more accurate representation of the object than the object model 304.

The process 300 also includes generating an object model 332 at operation 330. The object model 332 includes a representation generated by connecting adjacent intersections to form the perimeter of the representation. The object model 332 more closely aligns with the perimeter of the sensor data than the object model 304 while still preserving the benefits of the object model 304 (e.g., using a simplified geometry for various calculations and determinations). The object model 332 may then be used for one or more calculations and/or determinations by a vehicle or other computing system, as discussed herein.

Figure 4:
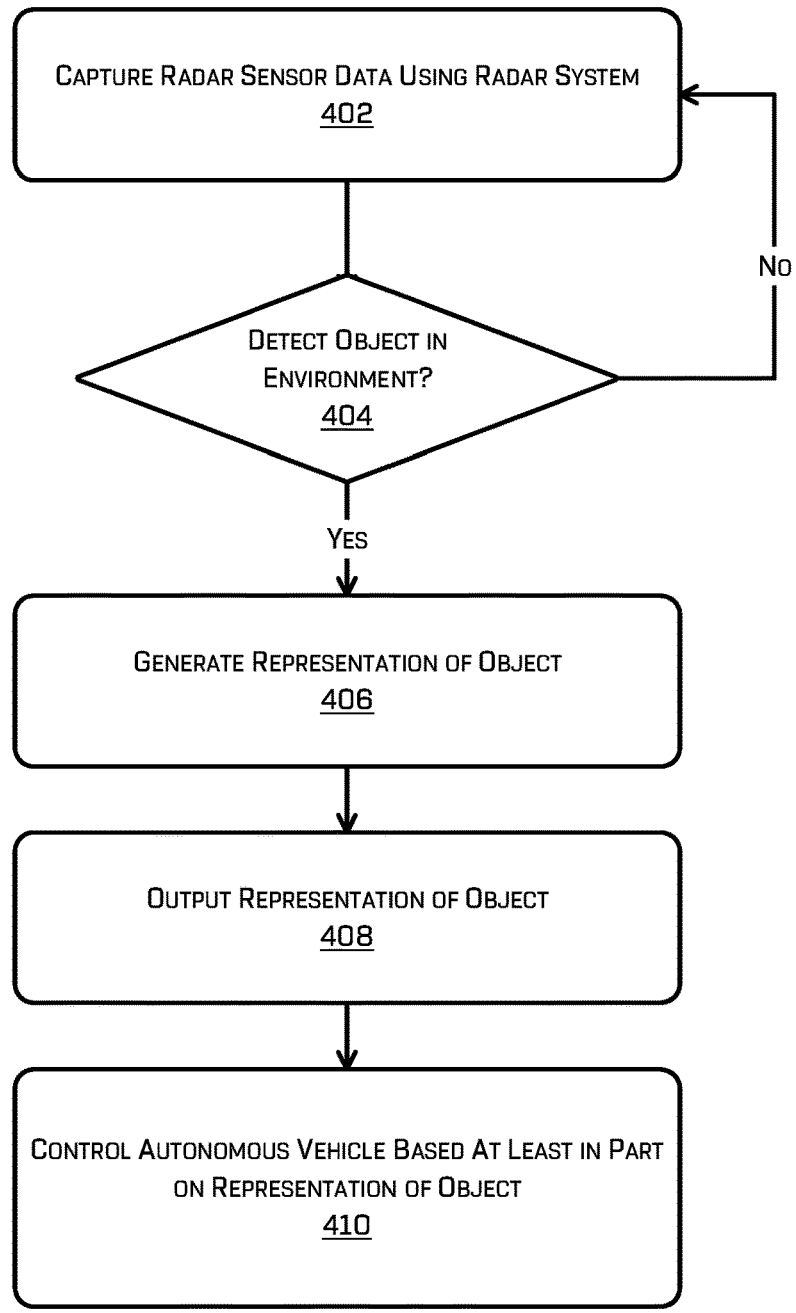
FIG. 4 illustrates an example process for controlling an autonomous vehicle using vector-based representations of objects in an environment around the autonomous vehicle according to at least one example.

FIG. 4 illustrates an example process 400 for controlling an autonomous vehicle using vector-based representations of objects in an environment around the autonomous vehicle according to at least one example. Although discussed in the context of radar data, the example process 400 can be used in the context of and/or in combination with lidar data, sonar data, time-of-flight image data, and the like.

At operation 402, a radar system is used to capture radar sensor data from an environment. In some examples, the radar system may include one or more radar sensors and may be a sensor system of an autonomous vehicle, such as vehicle 102 described above. The radar sensor data may include multiple returns, including static returns corresponding to objects having a location and a zero velocity, and dynamic returns or radar tracks corresponding to moving objects having a location and a non-zero velocity. A perception system of a vehicle computing device (e.g., vehicle computing device 106), may process the radar sensor data and determine whether or not objects are present in the environment.

At operation 404, the process 200 detects whether or not an object is located within the environment around the vehicle, e.g., whether an object is within a sensed region of the radar sensor. If not, the process returns at operation 402 to capture additional radar sensor data over time. If, at operation 404, an object is detected within the sensed region of the radar sensor, the process continues to operation 406, at which a representation of the object may be generated.

For example, a perception system of an autonomous vehicle can receive a point cloud or other group of points from the radar system that are associated with an object from which to determine the vector-based representation. The point cloud or other group of points may include a perimeter and/or determination of object type, or other such information.

In some examples, the radar data may be determined as a top-down representation of an object, e.g., in a two-dimensional (e.g., x-y) coordinate system. Although the radar data includes points forming (or outlining) a generally continuous contour, in other examples, sensors may provide data about fewer than all sides of a to-be-modelled object, e.g., because the sensor(s) may be unable to obtain data about hidden or occluded surfaces. In examples, radar data on such hidden or occluded surfaces may be estimated, e.g., based on known shapes and sizes of objects, and/or the model may be generated without points on the hidden or occluded surfaces. For example, the model may be updated, as described herein, without the points on the hidden or occluded surfaces.

Additionally, generating the representation may include determining a center of the object. The center of the object may be determined by a perception and/or planning component. In some examples, the center may be determined based on minimizing a distance from the center to each of the sensor data points around the perimeter. In some examples, the center may include a centroid or other such geometric determination of the center of the object. Additionally, a set of vectors and/or axes and may be determined that extend radially from the center.

Further, vector coordinates may be determined for the representation. The vector coordinates may be determined by extending, radially from the center, vectors along axes and/or directions. The intersections of the vectors and the radar data (e.g., at the perimeter of the object in the radar data) may be used to determine contours of the representation.

The representation may be generated by connecting adjacent intersections to form the perimeter of the representation. The representation may then be used for one or more calculations and/or determinations by a vehicle or other computing system, as discussed herein.

The representation may be updated dynamically, for example as the object moves and/or changes shape as detected by the sensors of the vehicle substantially continually (e.g., as additional sensor data is received and processed) or periodically (e.g., at a periodic of approximately 10 hertz. 30 hertz, etc.) and may, at operation 408, be output for use by one or more computing devices.

In some examples, at operation 410, the representation may be used by a vehicle computing device (e.g., vehicle computing device 106) of an autonomous vehicle to control the autonomous vehicle to safely traverse the environment. The representation may be updated as the vehicle traverses the environment and as dynamic objects in the environment move relative to the vehicle and/or change shape. The representation may be used by the vehicle computing device to more quickly and accurately plan a trajectory for the autonomous vehicle through the environment. For example, the vehicle computing device may plan a trajectory to pass through regions of the environment based on distances to the representation, and the corresponding object in real-world space. In some examples, the vehicle computing device may further rely on one or more other sensor system and/or map data to identify areas of the environment that are safe to drive.

Figure 5:
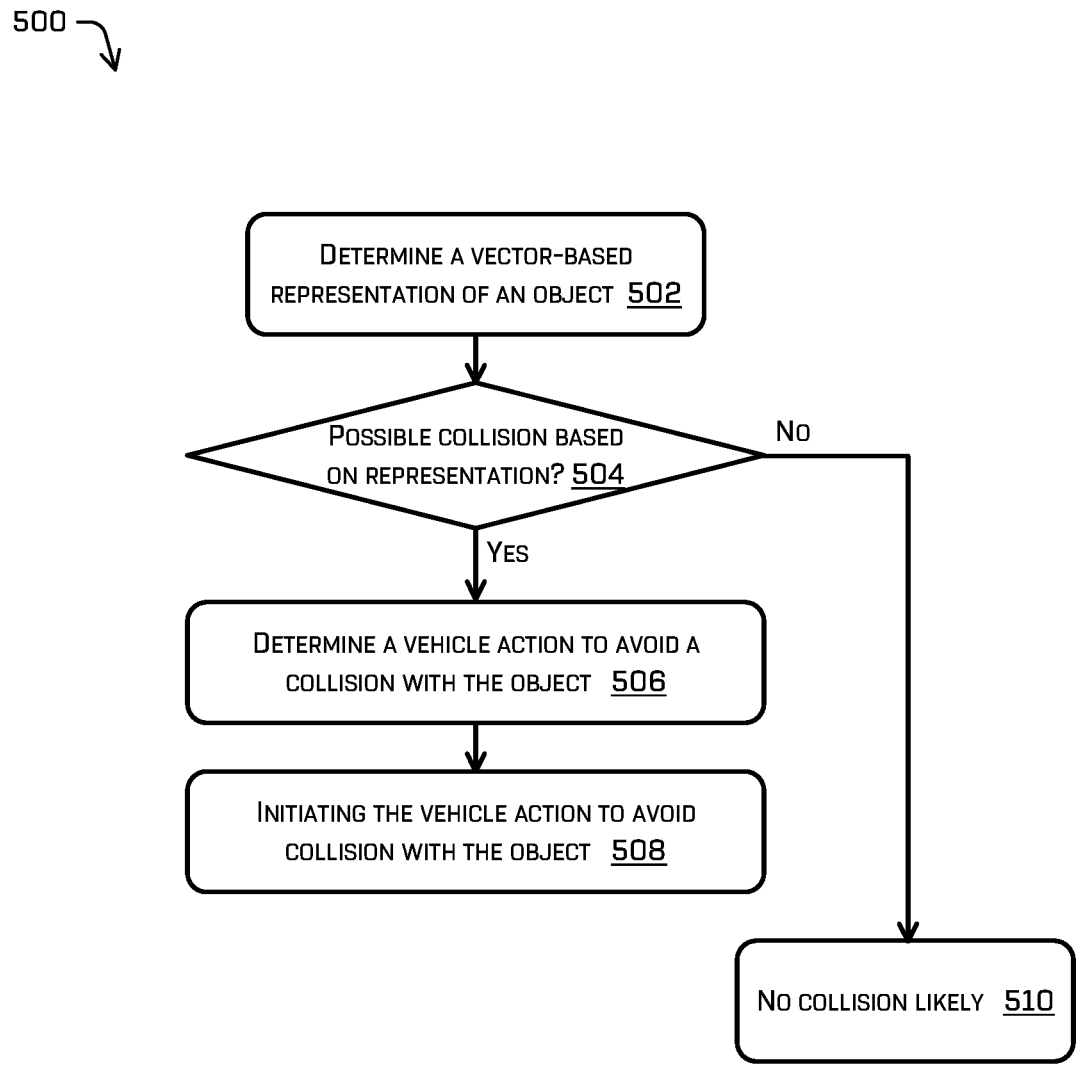
FIG. 5 illustrates an example process for performing a collision avoidance check using a vector-based representation of an object in an environment around a vehicle, according to at least one example.

FIG. 5 illustrates an example process 500 for performing a collision avoidance check using a vector-based representation of an object in an environment around a vehicle, according to at least one example. The operations described herein with respect to the process 300 may be performed by one or more vehicle computing devices, as discussed herein.

At operation 502, the process 500 may include determining a vector-based representation of an object, such as described herein. In some examples, the vector-based representation may be determined based on an image of the object, lidar data associated with the object, and the like. In some examples, the vector-based representation of the object may include multiple representations connected together, for example to represent an articulated (e.g., semi-truck and trailer) object that may change shape as it navigates. In some examples, multiple centers may be calculated for the articulated agents.

At operation 504, the process 500 may determine whether there is a possibility of a collision with the object based on the vector-based representation. In some examples, operation 504 may determine a likelihood of a collision between the object and a vehicle performing the process 500. If operation 504 determines there is no possibility of a collision (or the possibility is below a threshold value) based on the bounding box, the process ends at operation 510, which indicates a "no collision likely" status. In some examples, the "no collision likely" status may be communicated to one or more systems in the vehicle, other vehicles, other systems, the object, and the like.

If operation 504 determines that there is a possibility of a collision (e.g., the possibility is above a threshold value) based on vector-based representation, the process continues to operation 506.

In some examples, the vector-based representation discussed in operations 502 and 504 may have a relatively simple geometric shape. If a potential collision is detected (at operation 504), a more accurate representation of the object (e.g., as described with respect to FIG. 3 and/or a rich contour representation of the object) may be used to verify or disprove the potential collision detected at operation 504. This approach may reduce usage of computing resources by first checking for collision with the vector-based representation, which is a simple computation. The more complex computation associated with the vector-based representation may not be performed unless a collision is detected with the vector-based representation or if the vector-based representation is predicted to be within a threshold distance of a trajectory (and/or a simulated position of the vehicle along the trajectory).

At operation 506, the process may determine a vehicle action to avoid a collision with the object. For example, the vehicle action may include steering, braking, sounding a horn, warning vehicle occupants, and the like. As discussed herein, the vehicle action determined at operation 506 may vary depending on the distance from the object and the potential risk associated with the type of object. At operation 508, the vehicle action determined at operation 506 is initiated to avoid a collision with the object.

Figure 6:
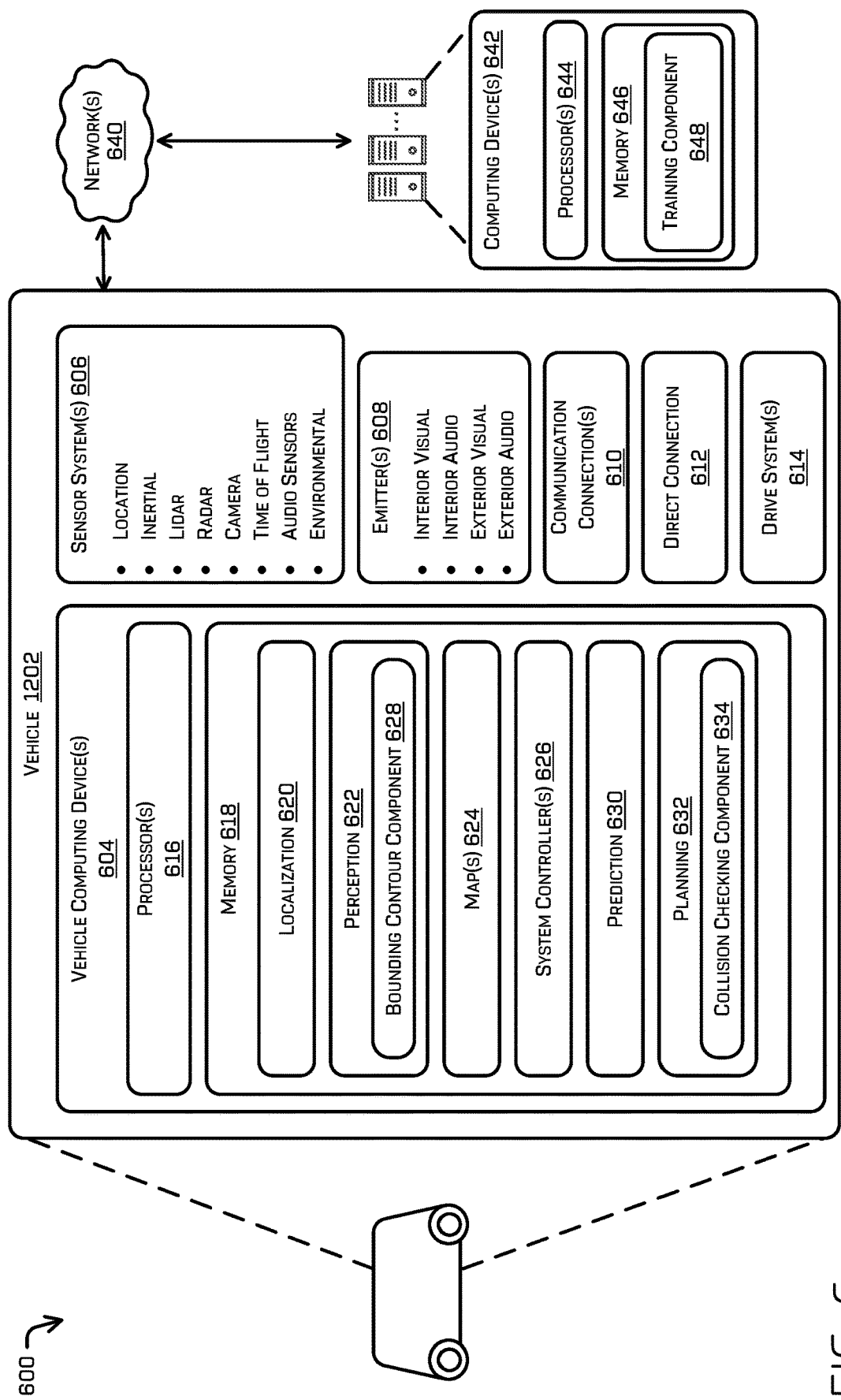
FIG. 6 is an illustration of an example system for implementing the techniques described herein.

FIG. 6 is an illustration of an example system 600 for implementing the techniques described herein. A vehicle 602 may include one or more vehicle computing devices 604, one or more sensor systems 606, one or more emitters 608, one or more communication connections 610, at least one direct connection 612, and one or more drive systems 614.

In some examples, the system 600 can be implemented as a vehicle, such as an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since vehicle can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled.

The vehicle computing device 604 may include one or more processors 616 and memory 618 communicatively coupled with the one or more processors 616. In the illustrated example, the vehicle 602 is an autonomous vehicle. However, the vehicle 602 may be any other type of vehicle. In the illustrated example, the memory 618 of the vehicle computing device 604 stores a localization component 620, a perception component 622, one or more maps 624, and one or more system controllers 626. Though depicted in FIG. 6 as residing in memory 618 for illustrative purposes, it is contemplated that the localization component 620, the perception component 622, the one or more maps 624, and the one or more system controllers 626 may additionally, or alternatively, be accessible to the vehicle 602 (e.g., stored remotely).

In at least one example, the localization component 620 may include functionality to receive data from the sensor system(s) 606 to determine a position and/or orientation of the vehicle 602 (e.g., one or more of an x-, y-, z-position, roll, pitch, or yaw). For example, the localization component 620 may include and/or request/receive a map of an environment and may continuously determine a location and/or orientation of the autonomous vehicle within the map. In some instances, the localization component 620 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 620 may provide data to various components of the vehicle 602 to determine an initial position of an autonomous vehicle for generating a trajectory and/or for generating or receiving map data, as discussed herein.

In some instances, the perception component 622 may include functionality to perform object detection, segmentation, and/or classification. In some examples, the perception component 622 may provide processed sensor data that indicates a presence of an entity that is proximate to the vehicle 602 and/or a classification of the entity as an entity type (e.g., car, pedestrian, cyclist, animal, building, tree, road surface, curb, sidewalk, unknown, etc.). In additional or alternative examples, the perception component 622 may provide processed sensor data that indicates one or more characteristics associated with a detected entity (e.g., a tracked object) and/or the environment in which the entity is positioned. In some examples, characteristics associated with an entity may include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In some examples, perception component 622 may include a bounding contour component 628 that may create and manage any number of bounding contours as discussed herein. In particular examples, the bounding contour component 628 identifies bounding contours associated with one or more objects.

The memory 618 may further include one or more maps 624 that may be used by the vehicle 602 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed, as discussed herein. In at least one example, the one or more maps 624 may include at least one map (e.g., images and/or a mesh). In some examples, the vehicle 602 may be controlled based at least in part on the map(s) 624. In some examples, the one or more maps 624 may be stored on a remote computing device(s) (such as the computing device(s) 642) accessible via network(s) 640. In some examples, multiple maps 624 may be stored based on, for example, a characteristic (e.g., type of entity, time of day, day of week, season of the year, etc.). Storing multiple maps 624 may have similar memory requirements but increase the speed at which data in a map may be accessed.

In at least one example, the vehicle computing device 604 may include one or more system controllers 626, which may be configured to control steering, propulsion, braking, safety, emitters, communication, and other systems of the vehicle 602. These system controller(s) 626 may communicate with and/or control corresponding systems of the drive system(s) 614 and/or other components of the vehicle 602.

In some examples, the memory 618 may include a prediction component 630 that predicts various activities and situations proximate the vehicle 602. In at least one example, prediction component 630 may predict a likelihood of a collision with an object or other vehicle activity or situation.

In some examples, the memory 618 may include a planning component 632 that plans various vehicle activities, plans vehicle trajectories to reach a destination, and the like. In at least one example, planning component 632 may include a collision checking component 634 that may identify potential collisions along a vehicle's trajectory. As discussed herein, collision checking component 634 may use a bounding contour to determine a distance (and likelihood of collision) between the vehicle 602 and a bounding contour associated with an object near the vehicle's trajectory.

In some instances, aspects of some or all of the components discussed herein may include any models, algorithms, and/or machine learning algorithms. For example, in some instances, the components in the memory 618 (and the memory 646, discussed below) may be implemented as a neural network.

As described herein, an exemplary neural network is an algorithm which passes input data through a series of connected layers to produce an output. Each layer in a neural network may also comprise another neural network or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 606 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), image sensors (e.g., RGB, IR, intensity, depth, etc.), time of flight sensors, audio sensors, wheel encoders, environment sensors (e.g., temperature sensors, humidity sensors, light sensors, pressure sensors, etc.), etc. The sensor system(s) 606 may include multiple instances of each of these or other types of sensors. For instance, the lidar sensors may include individual lidar sensors located at the corners, front, back, sides, and/or top of the vehicle 602. As another example, the image sensors may include multiple cameras disposed at various locations about the exterior and/or interior of the vehicle 602. The sensor system(s) 606 may provide input to the vehicle computing device 604. Additionally, or alternatively, the sensor system(s) 606 may send sensor data, via the one or more networks 640, to the one or more computing device(s) 642 at a particular frequency, after a lapse of a predetermined period of time, in near real-time, etc.

The vehicle 602 may also include one or more emitters 608 for emitting light and/or sound, as described above. The emitters 608 in this example include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example also include exterior emitters. By way of example, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 may also include one or more communication connection(s) 610 that enable communication between the vehicle 602 and one or more other local or remote computing device(s). For instance, the communication connection(s) 610 may facilitate communication with other local computing device(s) on the vehicle 602 and/or the drive system(s) 614. Also, the communication connection(s) 610 may allow the vehicle to communicate with other nearby computing device(s) (e.g., other nearby vehicles, traffic signals, etc.). The communications connection(s) 610 also enable the vehicle 602 to communicate with a remote teleoperation computing device or other remote services.

The communications connection(s) 610 may include physical and/or logical interfaces for connecting the vehicle computing device 604 to another computing device or a network, such as network(s) 640. For example, the communications connection(s) 610 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 may include one or more drive systems 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 may include one or more sensor systems to detect conditions of the drive system(s) 614 and/or the surroundings of the vehicle 602. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 614. In some cases, the sensor system(s) on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive system controller which may receive and preprocess data from the sensor system(s) and to control operation of the various vehicle systems. In some examples, the drive system controller may include one or more processors and memory communicatively coupled with the one or more processors. The memory may store one or more components to perform various functionalities of the drive system(s) 614. Furthermore, the drive system(s) 614 also include one or more communication connection(s) that enable communication by the respective drive system with one or more other local or remote computing device(s).

In at least one example, the direct connection 612 may provide a physical interface to couple the one or more drive system(s) 614 with the body of the vehicle 602. For example, the direct connection 612 may allow the transfer of energy, fluids, air, data, etc. between the drive system(s) 614 and the vehicle. In some instances, the direct connection 612 may further releasably secure the drive system(s) 614 to the body of the vehicle 602.

In some examples, the vehicle 602 may send sensor data to one or more computing device(s) 642 via the network(s) 640. In some examples, the vehicle 602 may send raw sensor data to the computing device(s) 642. In other examples, the vehicle 602 may send processed sensor data and/or representations of sensor data to the computing device(s) 642. In some examples, the vehicle 602 may send sensor data to the computing device(s) 642 at a particular frequency, after a lapse of a predetermined period of time, in near real-time, etc. In some cases, the vehicle 602 may send sensor data (raw or processed) to the computing device(s) 642 as one or more log files.

The computing device(s) 642 may include processor(s) 644 and a memory 646 storing a training component 648. In some examples, the training component 648 may include training data that has been generated by a simulator.

The processor(s) 616 of the vehicle 602 and the processor(s) 644 of the computing device(s) 642 may be any suitable processor capable of executing instructions to process data and perform operations as described herein. By way of example, the processor(s) 616 and 644 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618 and 646 are examples of non-transitory computer-readable media. The memory 618 and 646 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 618 and 646 may include at least a working memory and a storage memory. For example, the working memory may be a high-speed memory of limited capacity (e.g., cache memory) that is used for storing data to be operated on by the processor(s) 616 and 644. In some instances, the memory 618 and 646 may include a storage memory that may be a lower-speed memory of relatively large capacity that is used for long-term storage of data. In some cases, the processor(s) 616 and 644 may not operate directly on data that is stored in the storage memory, and data may need to be loaded into a working memory for performing operations based on the data, as discussed herein.

It should be noted that while FIG. 6 is illustrated as a distributed system, in alternative examples, components of the vehicle 602 may be associated with the computing device(s) 642 and/or components of the computing device(s) 642 may be associated with the vehicle 602. That is, the vehicle 602 may perform one or more of the functions associated with the computing device(s) 642, and vice versa.

EXAMPLE CLAUSES

A: A system comprising: one or more processors; and one or more non-transitory computer-readable media storing instructions executable by the one or more processors, wherein the instructions, when executed, cause the system to perform operations comprising: receiving sensor data from a sensor system associated with a vehicle, the sensor data associated with an object represented in the sensor data; determining, based on the sensor data, a bounding box representing the object; determining that the bounding box is insufficient for an operation of the vehicle; determining, based on the sensor data, a center of the object represented in the sensor data; determining a set of vectors, each of the set of vectors corresponding to a respective direction originating at the center of the object; determining a vector-based representation based on intersections between the set of vectors and a perimeter of the object based on the sensor data; and causing the vehicle to perform an action based on the vector-based representation being used by a prediction system of the vehicle.

B: The system of paragraph A, wherein determining the set of directions comprises determining a set of directions for at least eight vectors radially outward from the center.

C: The system of paragraph A, wherein the vector-based representation comprises a bounding contour defining a polygon representing the object in an environment around the vehicle.

D: The system of paragraph C, wherein the bounding contour is defined by connecting at least two points of the sensor data.

E: The system of paragraph A, further comprising: determining that a portion of the sensor data falls outside of the vector-based representation by a threshold area; and determining an additional vector for the set of vectors based on the portion of the sensor data falling outside of the vector-based representation.

F: A method comprising: receiving sensor data from a sensor associated with a vehicle; determining a portion of the sensor data associated with an object represented in the sensor data; determining, based on the portion of the sensor data, a point within the object represented in the sensor data; determining a plurality of intersections between vectors originating at the point of the object and a perimeter of the object based on the sensor data; determining, based on the plurality of intersections, a vector-based representation associated with the object; and performing an action based on the vector-based representation.

G: The method of paragraph F, wherein the point within the object comprises a barycenter of the object represented in the sensor data.

H: The method of paragraph F, further comprising determining, based on a position of the vehicle and a predicted position of the vector-based representation, a distance between the vehicle and the object, and wherein performing the action comprises determining a trajectory for the vehicle.

I: The method of paragraph H, wherein the action includes validating a trajectory or invalidating a trajectory for an autonomous vehicle.

J: The method of paragraph F, further comprising determining an orienting vector based on the vector-based representation of the object, the orienting vector defining a direction of travel or a reference orientation for the object.

K: The method of paragraph J, wherein the orienting vector is based at least in part on a predicted trajectory associated with the object.

L: The method of paragraph F, wherein the sensor is a lidar sensor and the sensor data comprises lidar data.

M: The method of paragraph F, wherein determining the plurality of intersections comprises determining directions for the vectors, and wherein the vector-based representation comprises magnitude data and direction data describing the object with respect to the point.

N: The method of paragraph F, further comprising: determining a portion of the sensor data falling outside of bounds associated with the vector-based representation exceeds a threshold amount; and determining an additional vector for vectors based on the portion of the sensor data, and wherein determining the vector-based representation is further based on an intersection of the additional vector and the sensor data.

O: The method of paragraph F, wherein determining the plurality of intersections comprises determining magnitudes for the vectors based on predefined direction data for the vectors, and wherein the vector-based representation comprises magnitude data describing the object with respect to the point based on the predefined direction data.

P: One or more non-transitory computer-readable media storing instructions that, when executed, cause one or more processors to perform operations comprising: receiving sensor data from a sensor associated with a vehicle; determining a portion of the sensor data associated with an object represented in the sensor data; determining, based on the portion of the sensor data, a point within the object represented in the sensor data; determining a plurality of intersections between vectors originating at the point of the object and a perimeter of the object based on the sensor data; determining, based on the plurality of intersections, a vector-based representation associated with the object; and performing an action based on the vector-based representation.

Q: The one or more non-transitory computer-readable media of paragraph P, the operations further comprising determining, based on a position of the vehicle and a predicted position of the vector-based representation, a distance between the vehicle and the object, and wherein performing the action comprises determining a trajectory for the vehicle.

R: The one or more non-transitory computer-readable media of paragraph P, the operations further comprising: determining a portion of the sensor data falling outside of bounds associated with the vector-based representation exceeds a threshold amount; and determining an additional vector for the vectors based on the portion of the sensor data, and wherein determining the vector-based representation is further based on an intersection of the additional vector and the sensor data.

S: The one or more non-transitory computer-readable media of paragraph P, wherein determining the plurality of intersections comprises determining magnitudes for the vectors based on predefined direction data for the vectors, and wherein the vector-based representation comprises magnitude data describing the object with respect to the point based on the predefined direction data.

T: The one or more non-transitory computer-readable media of paragraph P, the operations further comprising updating the vector-based representation by receiving second sensor data and determining a second plurality of intersections between the vectors and the perimeter of the object.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein. In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein described need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing instructions executable by the one or more processors, wherein the instructions, when executed, cause the system to perform operations comprising:
     receiving sensor data from a sensor system associated with a vehicle, the sensor data associated with an object represented in the sensor data;
     determining, based on the sensor data, a center of the object represented in the sensor data;
     determining a set of vectors, each of the set of vectors corresponding to a respective direction originating at the center of the object;
     determining a vector-based representation based on intersections between the set of vectors and a perimeter of the object based on the sensor data, wherein a portion of the sensor data associated with the object falls outside the vector-based representation; and
     causing the vehicle to navigate in an environment based at least in part on the vector-based representation.

2. The system of claim 1, wherein determining the set of vectors comprises determining a set of directions for at least eight vectors radially outward from the center.

3. The system of claim 1, wherein the vector-based representation comprises a bounding contour defining a polygon representing the object in the environment around the vehicle.

4. The system of claim 3, wherein the bounding contour is defined by connecting at least two points of the sensor data.

5. The system of claim 1, further comprising:
   determining an additional vector for the set of vectors based on the portion of the sensor data falling outside of the vector-based representation.

6. A method comprising:
   receiving sensor data from a sensor associated with a vehicle;
   determining a first portion of the sensor data associated with an object represented in the sensor data;
   determining, based on the first portion of the sensor data, a point within the object represented in the sensor data;
   determining a plurality of intersections between vectors originating at the point of the object and a perimeter of the object based on the sensor data;
   determining, based on the plurality of intersections, a vector-based representation associated with the object, wherein a second portion of the sensor data associated with the object falls outside the vector-based representation; and causing the vehicle to navigate in an environment based at least in part on the vector-based representation.

7. The method of claim 6, wherein the point within the object comprises a barycenter of the object represented in the first portion of the sensor data.

8. The method of claim 6, further comprising:

determining, based on a position of the vehicle and a predicted position of the vector-based representation, a distance between the vehicle and the object; and causing the vehicle to perform an action, wherein performing the action comprises determining a trajectory for the vehicle.

9. The method of claim 8, wherein the action includes validating the trajectory or invalidating the trajectory for the vehicle.

10. The method of claim 6, further comprising determining an orienting vector based on the vector-based representation of the object, the orienting vector defining a direction of travel or a reference orientation for the object.

11. The method of claim 10, wherein the orienting vector is based at least in part on a predicted trajectory associated with the object.

12. The method of claim 6, wherein the sensor is a lidar sensor and the sensor data comprises lidar data.

13. The method of claim 6, wherein determining the plurality of intersections comprises determining directions for the vectors, and wherein the vector-based representation comprises magnitude data and direction data describing the object with respect to the point.

14. The method of claim 6, further comprising:

determining that the second portion of the sensor data falling outside of bounds associated with the vector-based representation exceeds a threshold amount; and determining an additional vector based on the second portion of the sensor data, and wherein determining the vector-based representation is further based on an intersection of the additional vector and the second portion of the sensor data.

15. The method of claim 6, wherein determining the plurality of intersections comprises determining magnitudes for the vectors based on predefined direction data for the vectors, and wherein the vector-based representation comprises magnitude data describing the object with respect to the point based on the predefined direction data.

16. One or more non-transitory computer-readable media storing instructions that, when executed, cause one or more processors to perform operations comprising:

receiving sensor data from a sensor associated with a vehicle;

determining a first portion of the sensor data associated with an object represented in the sensor data;

determining, based on the first portion of the sensor data, a point within the object represented in the sensor data;

determining a plurality of intersections between vectors originating at the point of the object and a perimeter of the object based on the first portion of the sensor data;

determining, based on the plurality of intersections, a vector-based representation associated with the object, wherein a second portion of the sensor data associated with the object falls outside the vector-based representation; and causing the vehicle to navigate in an environment based at least in part on the vector-based representation.

17. The one or more non-transitory computer-readable media of claim 16, the operations further comprising:

determining, based on a position of the vehicle and a predicted position of the vector-based representation, a distance between the vehicle and the object; and causing the vehicle to perform an action, wherein performing the action comprises determining a trajectory for the vehicle.

18. The one or more non-transitory computer-readable media of claim 16, the operations further comprising:

determining that the second portion of the sensor data falling outside of bounds associated with the vector-based representation exceeds a threshold amount; and determining an additional vector based on the second portion of the sensor data, and wherein determining the vector-based representation is further based on an intersection of the additional vector and the second portion of the sensor data.

19. The one or more non-transitory computer-readable media of claim 16, wherein determining the plurality of intersections comprises determining magnitudes for the vectors based on predefined direction data for the vectors, and wherein the vector-based representation comprises magnitude data describing the object with respect to the point based on the predefined direction data.

20. The one or more non-transitory computer-readable media of claim 16, the operations further comprising updating the vector-based representation by receiving second sensor data and determining a second plurality of intersections between the vectors and the perimeter of the object.

* * * * *